(No Model.)
F. SIEMENS.
REGENERATIVE GAS BURNER.
No. 399,290.          Patented Mar. 12, 1889.
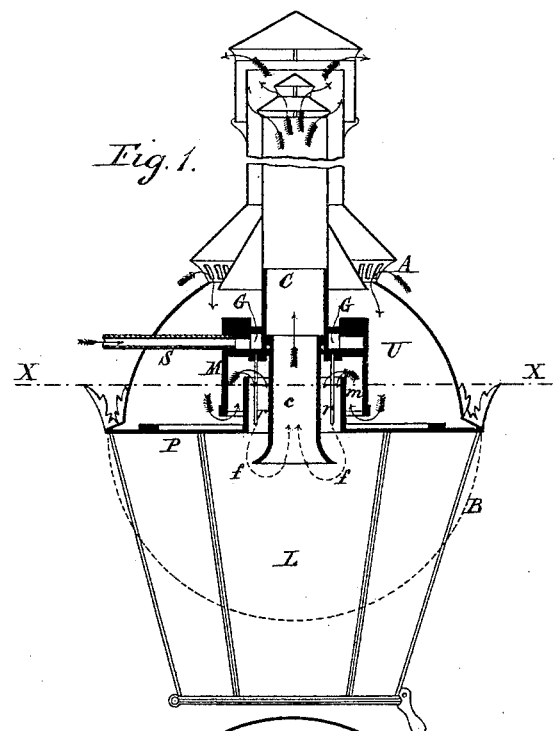

UNITED STATES PATENT OFFICE.

FREDERICK SIEMENS, OF DRESDEN, SAXONY, GERMANY.

REGENERATIVE GAS-BURNER.

SPECIFICATION forming part of Letters Patent No. 399,290, dated March 12, 1889.

Application filed October 30, 1886. Serial No. 217,585. (No model.) Patented in France October 22, 1886, No. 179,187; in England October 26, 1886, No. 13,701; in Belgium October 26, 1886, No. 74,991; in Italy November 23, 1886, XLI, 81; in Spain January 10, 1887, No. 6,391, and in Austria-Hungary April 4, 1887, No. 42,048 and No. 9,415.

*To all whom it may concern:*

Be it known that I, FREDERICK SIEMENS, a citizen of Saxony, residing at Dresden, in the Empire of Germany, have invented a new and useful Improvement in Gas Lamps and Lanterns, (for which Letters Patent have been obtained in France, No. 179,187, of October 22, 1886; Great Britain, No. 13,701, of October 26, 1886; Belgium, No. 74,991, of October 26, 1886; Italy, Vol. XLI, 81, of November 23, 1886; Spain, No. 6,391, of January 10, 1887, and Austria-Hungary, No. 42,048/9,415, of April 4, 1887,) of which the following is a specification.

My invention relates to the construction of a lamp or lantern with a gas-burner and ducts for air and for products of combustion so arranged that heat is imparted from those products to the air and gas supplied, thereby causing great brilliancy of flame.

I will describe this construction, referring to the accompanying drawings.

Figure 1 is a vertical section, and Fig. 2 is a sectional plan, on line X X of Fig. 1, of a lantern according to my invention.

The body of the lantern is divided into an upper compartment, U, and a lower compartment, L, by a horizontal partition, P, which should be of ceramic material or enameled metal, so as to act as a reflector. The lower compartment, L, is closed in on all sides by glass. In the upper compartment, U, to which air is admitted through shielded perforations A, there is fixed a metal cylinder, M, open at the bottom and having formed in its upper part an annular chamber, G, to which gas is admitted by the service-pipe S. From this chamber a number of small tubes, $r$, arranged in a circle, project downward between a metal ring, $m$, and a central trumpet-mouth chimney, $c$, made of refractory material, such as porcelain. This chimney communicates with a metal chimney, C, above, from which the products of combustion escape through shielded perforations at the top of the lantern. The gas, itself warmed, issuing in numerous jets from the tubes $r$ and supplied with air heated by its passage along the heated surfaces of M and $m$, forms a bulbous flame, (indicated in outline by the dotted arrows $f$,) first descending outside the trumpet-mouth of the chimney $c$ and then ascending within it. The hot products of combustion ascending the chimney $c$ C heat the metal cylinder M and the radiation of the flame heats $m$, and thus the gas in passing through G and the tubes $r$ and the air in passing along the heated surfaces of M and $m$ become heated, so that very perfect combustion is effected and great brilliancy of light is produced. As the flame depends for its form on the direction in which the air and products of combustion flow, as indicated by the arrows, the opening of the lower compartment, L, by the breaking of its glass or otherwise, while it will not necessarily cause extinction of the flame, will entirely alter its character, rendering it comparatively useless for illumination.

Although I have shown my invention as applied to a lantern having its lower compartment inclosed by flat sides glazed, obviously the same arrangement of burner and air and gas ducts may be used in a lamp having its lower compartment inclosed by a basin-glass, as indicated by the dotted line B. Such a lamp may be fixed in the ceiling of a carriage, or may be suspended from the ceiling of an apartment, in which latter case the upper part of the lamp need not be provided with arrangements such as are shown for shielding the outlets against the effects of external currents.

Having thus described the nature of my invention and the best way I know of carrying it out in practice, I claim—

In a gas-lamp, the combination of a horizontal partition constructed of material having a reflecting-surface, a lower compartment closed on all sides by glass, an upper compartment to which air is admitted through shielded perforations, a metal cylinder open at its bottom and having formed upon its top an annular gas-chamber, a metal ring projecting upward from the partition-plate, a central trumpet-mouthed flue made of refractory material, a series of small tubes projecting downward from the gas-chamber between the said ring and the said flue, and a chimney from which the products of combustion escape through shielded perforations at the top of the upper compartment, as and for the purposes described.

In testimony whereof I have signed my name to this specification, in the presence of two subscribing witnesses, this 14th day of October, A. D. 1886.

FREDERICK SIEMENS.

Witnesses:
   J. G. GORDON,
   JNO. P. M. MILLARD,
*Clerk to Messrs. Abel & Imray, Consulting Engineers and Patent Agents, 28 Southampton Buildings, London, W. C.*